US008358662B2

(12) United States Patent
Bernstein et al.

(10) Patent No.: US 8,358,662 B2
(45) Date of Patent: Jan. 22, 2013

(54) CREATING AND MAINTAINING TRAFFIC ENGINEERED DATABASE FOR PATH COMPUTATION ELEMENT

(75) Inventors: Greg M. Bernstein, Fremont, CA (US); Young Lee, Plano, TX (US); Yijun Xiong, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 199 days.

(21) Appl. No.: 12/545,663

(22) Filed: Aug. 21, 2009

(65) Prior Publication Data

US 2010/0054267 A1  Mar. 4, 2010

Related U.S. Application Data

(60) Provisional application No. 61/093,310, filed on Aug. 30, 2008, provisional application No. 61/100,492, filed on Sep. 26, 2008.

(51) Int. Cl.
*H04L 12/28* (2006.01)
(52) U.S. Cl. ....................... 370/410; 709/238
(58) Field of Classification Search ........... 370/410; 709/238
See application file for complete search history.

(56) References Cited

U.S. PATENT DOCUMENTS

| | | | | |
|---|---|---|---|---|
| 6,985,959 | B1 * | 1/2006 | Lee | 709/238 |
| 7,158,486 | B2 * | 1/2007 | Rhodes | 370/256 |
| 7,286,490 | B2 | 10/2007 | Saleh et al. | |
| 2006/0176820 | A1 * | 8/2006 | Vasseur et al. | 370/241 |
| 2006/0215547 | A1 * | 9/2006 | Koppol | 370/220 |
| 2008/0075011 | A1 | 3/2008 | Mack-Crane et al. | |
| 2008/0151755 | A1 * | 6/2008 | Nishioka | 370/235 |
| 2008/0240120 | A1 * | 10/2008 | Kusama et al. | 370/400 |
| 2009/0182894 | A1 * | 7/2009 | Vasseur et al. | 709/239 |

FOREIGN PATENT DOCUMENTS

| | | |
|---|---|---|
| CN | 101094168 A | 12/2007 |
| CN | 101141376 A | 3/2008 |
| WO | 2007011927 A2 | 1/2007 |
| WO | 2008046322 A1 | 4/2008 |

OTHER PUBLICATIONS

Farrell, A., et al., "A Path Computation Element (PCE)-Based Architecture," RFC 4655, Aug. 2006.
Le Roux, J., Ed., "Requirements for Path Computation Element (PCE) Discovery," RFC 4674, Oct. 2006.
Le Roux, JL., Ed., et al., "OSPF Protocol Extensions for Path Computation Element (PCE) Discovery," RFC 5088, Jan. 2008.

(Continued)

*Primary Examiner* — Robert Wilson
*Assistant Examiner* — Wei Zhao
(74) *Attorney, Agent, or Firm* — Conley Rose, P.C.; Grant Rodolph; Brandt Howell (57) ABSTRACT

An apparatus comprising a node configured to communicate with a path computation element (PCE) and a neighbor node, wherein the node is configured to send a local traffic engineering (TE) information directly to the PCE without sending the local TE information to the neighbor node. Also disclosed is a network component comprising at least one processor configured to implement a method comprising establishing a PCE protocol (PCEP) session with a PCE, and sending a TE information directly to the PCE without flooding the TE information. Also disclosed is a method comprising receiving a TE information, updating a first TE database (TED) using the TE information, and synchronizing the first TED with a second TED.

23 Claims, 8 Drawing Sheets

OTHER PUBLICATIONS

Le Roux, JL., Ed., et al., "IS-IS Protocol Extensions for Path Computation Element (PCE) Discovery," RFC 5089, Jan. 2008.
Berger, L., et al., "The OSPF Opaque LSA Option," RFC 5250, Jul. 2008.
Java Message Service, Version 1.1, Apr. 2002, Sun Microsystems.
Lee, Y., et al., "PCEP Requirements for WSON Routing and Wavelength Assignment" draft-lee-pce-wson-routing-wavelength-05.txt, Jun. 2009.
Lee, Y., et al., "PCEP Requirements and Extensions for WSON Routing and Wavelength Assignment," draft-lee-pce-wson-routing-wavelength-02.txt, Jun. 2008.
Bates, T., et al., "BGP Route Reflection: An Alternative to Full Mesh Internal GPB (IBGP)," RFC 4456, Apr. 2006.
Bernstein, G., et al., "A Framework for the Control and Measurement of Wavelength Switched Optical Networks (WSON) with Impairments", draft-bernstein-ccamp-wson-impairments-00.txt; Oct. 2008.
Lee, Y., et al., "Framework for GMPLS and PCE Control of Wavelength Switched Optical Networks," draft-ietf-ccamp-wavelength-switched-framework-01.txt, Oct. 2008.
Lee, Y., et al., "Framework for GMPLS and PCE Control of Wavelength Switched Optical Networks," draft-ietf-ccamp-wavelength-switched framework-00.txt, May 2008.
Lee, Y., et al., "Information Model for Impaired Optical Path Validation," draft-bernstein-wson-impairment-info-02.txt, Jul. 2009.
Katz, D., et al., "Traffic Engineering (TE) Extensions to OSPF Version 2," RFC 3630, Sep. 2003.
Smit, H., et al., "Intermediate System to Intermediate System (IS-IS) Extensions for Traffic Engineering (TE)," RFC 3784, Jun. 2004.
Kohler, E., et al., "Datagram Congestion Control Protocol (DCCP)," RFC 4340, Mar. 2006.
Zeilenga, K., Ed., "Lightweight Directory Access Protocol (LDAP): Technical Specification Road Map," RFC 4510, Jun. 2006.
Sermersheim, J., Ed., "Lightweight Directory Access Protocol (LDAP): The Protocol," RFC 4511, Jun. 2006.
Vasseur, J.P., Ed., et al., "Path Computation Element (PCE) Communication Protocol (PCEP)," draft-ietf-pce-pcep-15.txt, Sep. 2008.
Vasseur, J.P., Ed., et al., "Path Computation Element (PCE) Communication Protocol (PCEP)," draft-ietf-pce-pcep-13.txt, Aug. 2008.
Bernstein, G., et al., "Routing and Wavelength Assignment Information Model for Wavelength Switched Optical Networks," draft-ietf-ccamp-rwa-info-00.txt, Aug. 2008.
Li, T., et al., "IS-IS Extensions for Traffic Engineering," RFC 5305, Oct. 2008.
Ash, J., Ed., et al., "Path Computation Element (PCE) Communication Protocol Generic Requirements," RFC 4657, Sep. 2006.
Kompella, K., Ed., et al., "Routing Extensions in Support of Generalized Multi-Protocol Label Switching (GMPLS)," RFC 4202, Oct. 2005.
ITU-T Recommendation G.680, "Series G: Transmission Systems and Media, Digital Systems and Networks—Transmission Media and Optical Systems Characteristics—Characteristics of Optical Systems—Physical Transfer Functions of Optical Network Elements," Jul. 2007.
Foreign Communication From a Related Counterpart Application, PCT Application PCT/CN2009/073561, International Search Report dated Dec. 3, 2009, 3 pages.
Foreign Communication From a Related Counterpart Application, PCT Application PCT/CN2009/073561, Written Opinion dated Dec. 3, 2009, 4 pages.
Bernstein, G., et al., "Alternative Approaches to Traffic Engineering Database Creation and Maintenance for Path Computation Elements," draft-bernstein-pce-ted-alternatives-00.txt, Dec. 20, 2011, 12 pages.
Newton, Harry and Steven Schoen, Editors, Newton's Telecom Dictionary, 26th Updated and Expanded Edition, Flatiron Publishing, 2011, p. 792.
Newton, Harry and Steven Schoen, Editors, Newton's Telecom Dictionary, 26th Updated and Expanded Edition, Flatiron Publishing, 2011, p. 1170.
"Network Topology," http://en.wikipedia.org/w/index.php?title=Network_topology, May 21, 2012, 10 pages.
"Forwarding Information Base," http//:en.wikipedia.org/w/index.php?title=Fowarding_information_base, May 21, 2012, 4 pages.
Awduche, D., et al., "Requirements for Traffic Engineering Over MPLS," RFC 2702, Sep. 1999, 29 pages.
Baker, F., "Requirements for IP Version 4 Routers," RFC 1812, Jun. 1995, 176 pages.
In Re Robert K. Grasselli and Harley F. Hardman, Appellants, and Rohm and Haas Company, Inventor, Appeal No. 83-504, 713 F.2d 731, 218 U.S.P.Q. 769 (Fed. Cir. 1983), 19 pages.
In Re Ferdinand J. Ratti, Appeal No. 6452, 270 F.2d 810, 123 U.S. P.Q. 349 (C.C.P.A. 1959), 7 pages.
In Re Lucas S. Gordon and Kari M. Sutherland, Appeal No. 83-1281, 733 F.2d 900, 221 U.S.P.Q. 1125 (Fed. Cir. 1984), 3 pages.
Consideration of Applicant's Rebuttal Arguments, MPEP 2145, 9 pages.

* cited by examiner

FIG. 8

CREATING AND MAINTAINING TRAFFIC ENGINEERED DATABASE FOR PATH COMPUTATION ELEMENT

CROSS-REFERENCE TO RELATED APPLICATIONS

The present application claims priority to U.S. Provisional Patent Application Ser. No. 61/093,310 filed Aug. 30, 2008 by Bernstein et al. and entitled "Alternative Approaches to Traffic Engineering Database Creation and Maintenance for Path Computation Elements," and U.S. Provisional Patent Application Ser. No. 61/100,492 filed Sep. 26, 2008 by Young Lee et al. and entitled "Alternative Approaches to Traffic Engineering Database Creation and Maintenance for Path Computation Elements," which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In Multiprotocol Label Switching (MPLS) networks and Generalized MPLS (GMPLS) networks, connection oriented packet services and virtual circuits can be established using a Traffic Engineering Database (TED) that comprises up-to-date and accurate Traffic Engineering (TE) information. Typically, a copy of the TED is created and maintained by at least some of the nodes in the network using an interior gateway protocol (IGP) with TE extension (IGP-TE). The individual nodes can use the TE information to compute their own TE Label Switched Paths (TE-LSPs). Some GMPLS networks have TE information that may be substantially complex, such as in wavelength switched optical networks (WSONs), e.g. as described by Lee et al. in Internet Engineering Task Force (IETF) document draft-bernstein-wson-impairment-info-02.txt, published March 2009, and entitled "Information Model for Impaired Optical Path Validation," which is incorporated herein by reference as if reproduced in its entirety. In such networks, the TE information can be flooded from the nodes to a Path Computation Element (PCE), which is configured to handle such information and compute the TE paths in the network.

SUMMARY

In one embodiment, the disclosure includes an apparatus comprising a node configured to communicate with a PCE and a neighbor node, wherein the node is configured to send a local TE information directly to the PCE without sending the local TE information to the neighbor node.

In another embodiment, the disclosure includes a network component comprising at least one processor configured to implement a method comprising establishing a PCE protocol (PCEP) session with a PCE, and sending a TE information directly to the PCE without flooding the TE information.

In yet another embodiment, the disclosure includes a method comprising receiving a TE information, updating a first TED using the TE information, and synchronizing the first TED with a second TED.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for distributing TE information in networks, such as MPLS or GMPLS networks. Specifically, some types of information, such as TE information, may be forwarded to at least one PCE without flooding the information to other network nodes. However, other types of information, such as topology information, may be flooded to both the PCE and the network nodes. The PCE may use the TE information to create a TED and compute the TE paths. In a first network architecture, each node may send the TE and topology information to a plurality of the PCEs associated with the nodes. In another network architecture, the nodes may send the TE and topology information to an intermediary server that in turn may forward the TE information to the PCEs. In a third network architecture, each node may send the TE and topology information to one of a plurality of PCEs, which then may share the information with each other. Regardless of the architecture, topology information may be distributed between the nodes, for instance using IGP, and may be maintained locally at the nodes. By offloading the tasks of creating and maintaining the TED from the nodes to the PCE, some of the nodes' resources may be freed and hence network efficiency may be improved.

Figure 1:
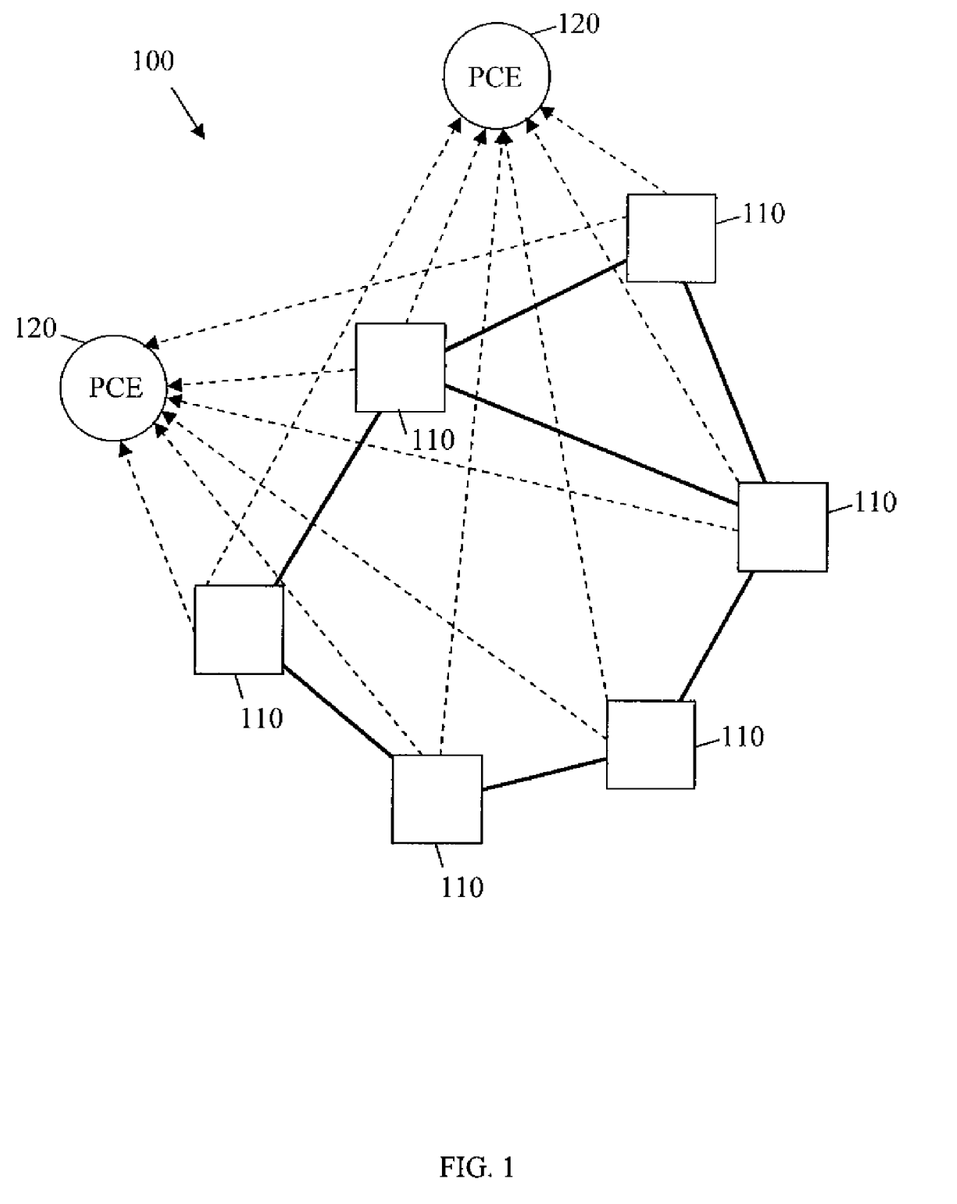
FIG. 1 is a schematic diagram of an embodiment of a first network architecture.

FIG. 1 illustrates one embodiment of a first network architecture 100, which may be a MPLS or GMPLS network. The first network architecture 100 may comprise a plurality of nodes 110 and at least one PCE 120. The nodes 110 and the PCE 120 may communicate with each other via optical, electrical, and/or wireless means. In addition, some of the nodes 110, for example those at the edges of the network, may be configured to convert between signal types transmitted within the network and signal types used by external sources. The signals may be transported through the network over TE links or paths that may pass through some of the nodes 110. Although six nodes 110 and two PCEs 120 are shown in the first network architecture 100, the network may comprise any number of nodes 110 and PCEs 120. In some embodiments, the network may be a wavelength division multiplexing (WDM) based network such as a WSON, which may use active or passive components and may implement WDM to transport optical signals. Accordingly, the nodes 110 and the PCE 120 may be coupled to one another using optical fibers and the TE links or paths may be referred to as lightpaths. The optical links may have some constraints or other properties, and thus in some embodiments the optical fibers be considered network elements.

In an embodiment, the PCE 120 may be a dedicated server in the network or located at one of the nodes 110, and may be configured for TE path computation. The PCE 120 may comprise a traditional PCE (e.g. an entity that computes TE paths within the network), a TED server (e.g. a logical software entity that manages the TED and provides the TE information in the TED to the PCE without calculating any TE paths), or both. The PCE 120 may be a local PCE associated with at least one of the nodes 110 and may be configured to compute the TE paths, such as TE-LSPs, between the associated nodes 110 using the TE and/or topology information from the nodes 110. The PCE 120 may comprise more processing power than the nodes 110, which may allow the PCE 120 to perform more sophisticated path computation algorithms instead of the nodes 110. Offloading the TE path computation from the nodes 110 to the dedicated PCE 120 may also reduce cost and free more resources in the network. The PCE 120 may then send the computed TE paths to the corresponding nodes 110 assigned to each of the TE paths. For example, in WDM based networks such as the WSON, some of the nodes 110 may be path computation clients (PCCs) that forward the TE information, such as routing and/or wavelength assignment (RWA) information to the PCE 120. The PCE 120 may receive the RWA information from the nodes 110 and then process the information to compute the TE paths, for example by computing the routes, e.g. lightpaths, for the optical signals, and specifying the optical wavelengths that are used for each lightpath. For example, the PCE 120 may use the TE and topology information to compute the TE paths, for example as described by Farrel et al. in IETF document Request for Comments (RFC) 4655, published August 2006, and entitled "A Path Computation Element (PCE)-Based Architecture," which is incorporated herein by reference as if reproduced in its entirety. The PCE 120 may then send all or part of the computed TE path (e.g. RWA) information to the nodes 110.

In an embodiment, each node 110 may be aware of its link state, e.g. the state of its local links with other nodes 110, and its local properties, e.g. port, bandwidth, and/or channel restrictions. The nodes 110 may also be configured to send their TE information to all the PCEs 120 associated with the nodes 110, such as PCEs 120 that may share the same domain with the nodes 110, and receive computed TE path information from the PCEs 120. In FIG. 1, the dashed arrows indicate the flow of the local TE information from the nodes 110 to the PCE 120 and the solid lines indicate the connections, e.g. optical links, which may connect between the nodes 110. The nodes 110 in the same domain in the network may send their TE information to the same PCEs 120 in the same domain, as shown in FIG. 1. In an embodiment, at least one of the nodes 110 may be a network management system, an element management system, and/or another PCE 120. If the nodes 110 are in different domains, they may send their TE information to different PCEs 120 in their corresponding domains. Similarly, the nodes 110 may receive the computed TE path information from the PCEs 120 in the corresponding domain(s). In an embodiment, the nodes 110 may be referred to as network elements (NEs), and thus the two terms are used interchangeably herein. In an embodiment, each node 110 may comprise a link state data base (LSDB), which may be created and maintained by the node 110 using IGP. The LSDB may comprise topology information and/or information about the state of the local links of the node 110, but may not comprise any TE information. The node 110 may use the LSDB information to forward the data in the network. On the other hand, the node 110 may route packets via the TE paths (e.g., TE-LSPs) assigned by the PCE 120.

The TE information may comprise information used by the PCEs 120 but not the nodes 110. In an embodiment, the TE information may comprise relatively large and/or static information. For example, the TE information may comprise information about at least some of the nodes' local properties, link states, bandwidth or wavelength constraints, and/or other information that may be used by the PCE 120 to compute the TE paths. In WDM based networks such as WSONs, the TE information may comprise information about node switching asymmetry structure, wavelength constraints, and information on wavelength usage per link. Such information is described by Lee et al. in IETF document draft-ietf-ccamp-wavelength-switched-framework-01.txt, published February 2009, and entitled "Framework for CMPLS and PCE Control of Wavelength Switched Optical Networks," which is incorporated herein by reference as if reproduced in its entirety.

In contrast, the topology information may comprise information used by the PCEs 120 and the nodes 110. In an embodiment, the topology information may comprise relatively small and/or dynamic information. For example, the topology information may comprise information about faulty nodes, bandwidth, and/or lightpath usage, and other information used by both the nodes 110 and the PCE 120. The topology information may be flooded, e.g. distributed via IGP-TE, between the nodes 110 and/or the PCE 120. By separating the TE information into information forwarded to the PCE 120 and information distributed between the nodes 110, the information distribution or sharing constraints may be met and the sizes of the local TEDs, and hence storage demands in the nodes 110, may be reduced. Similarly, the processing demands for local TED updates and synchronization in the nodes 110 may be reduced. Further, some of the nodes 110 may not need distributed TE information from the other nodes 110, and thus may not create or maintain a local TED. Not creating or maintaining a local TED may reduce the communications demands, for instance at the network's control plane. Additionally, the central TED at the PCE 120 may be updated more frequently or with less delay time.

In an embodiment, at least some of the nodes 110 do not comprise a TED. Specifically, the nodes 110 may create and maintain the local LSDBs for routing and data forwarding purposes without creating and maintaining local TEDs. Creating and maintaining a local copy of the TED by each node 110, for instance using IGP-TE, Open Shortest Path First-Traffic Engineering (OSPE-TE), or Intermediate System to Intermediate System-Traffic Engineering (IS-IS-TE), may not be favorable. For instance, maintaining a local TED at some of the nodes 110 may require the nodes 110 to have additional processing power, storage space, and/or allocated bandwidth. Additionally, flooding the TE information between the nodes 110 may cause message propagation delays and communication inefficiencies in the network. Further, in the case of WSONs, the information used for calculating lightpaths may comprise a minimum set of optical impairment data and/or optical impairment data, which may have sharing constraints. The sharing constraints of the optical impairment data may restrict the distribution of information via IGP-TE to some of the nodes 110, as described by Bernstein et al. in IETF document draft-bernstein-ccamp-wson-impairments-00.txt, published October 2008, and entitled "A Framework for the Control and Measurement of Wavelength Switched Optical Networks (WSON) with Impairments," which is incorporated herein by reference as if reproduced in its entirety. In some cases, the optical impairment data that has sharing constraints may still need to be stored in the TEDs of some of the nodes 110, although doing so may increase network complexity and reduce efficiency.

Instead, the PCE 120 may comprise a TED, which may be created and maintained by the PCE 120. Specifically, the PCE 120 may receive the local TE information from the nodes 110 and compile the TED. The TE information received from each node 110 may be the local TE information for that node 110. Since the nodes 110 may not flood their local TE information to the other nodes 110, the TE information received from each node 110 may be different. The TE information may then be used to obtain the computed TE paths. The TED at the PCE 120 may be updated periodically or upon demand to move toward optimum TE path computation. For instance, the nodes 110 may send to the PCE 120 their current TE information, periodically or upon request, and the TE information may be used to update the TED. In an alternative embodiment, the PCE 120 may create and maintain a central TED and at least some of the nodes 110 may also create and maintain local TEDs. As such, some TE information may be sent from the nodes 110 to the PCE 120 and used to obtain the central TED, and other TE information may be flooded between the nodes 110 to obtain the local TEDs.

To support the central TED at the PCE 120, the PCE 120 may be configured for robust data handling and load sharing. The nodes 110 may also be configured to use procedures, mechanisms, and/or protocols for sending the TE information to the PCE 120, and the PCE 120 may be configured to use procedures, mechanisms, and/or protocols for receiving the TE link information. In the case of multiple PCEs 120 in the first network architecture 100, at least some the PCEs 120 may also be configured to share the same TED. Additionally, the nodes 110 may be configured to discover or find the PCE(s) 120 that may receive the corresponding TE information, for example using a PCE discovery procedures as described by LeRoux et al. in IETF document RFC 4674, published October 2006, and entitled "Requirements for Path Computation Element (PCE) Discovery," which is incorporated herein by reference as if reproduced in its entirety.

Separating the information need to calculate and maintain the TE paths into TE information that is forwarded to the PCE 120 and topology information that is distributed between the nodes 110 may create additional requirements, such as the need for configuring and securing additional protocols. Further, any new protocols may need to support features similar to the IGP-TE features, such as removal of state information, reliable delivery of updates to all participants, recovery after reboots, crashes, and/or upgrades, etc. Forwarding the TE information to the PCE 120 and among the nodes 110 may also require node mechanisms to discover the PCE(s) 120 that may be capable of accepting direct TED updates.

Figure 2:
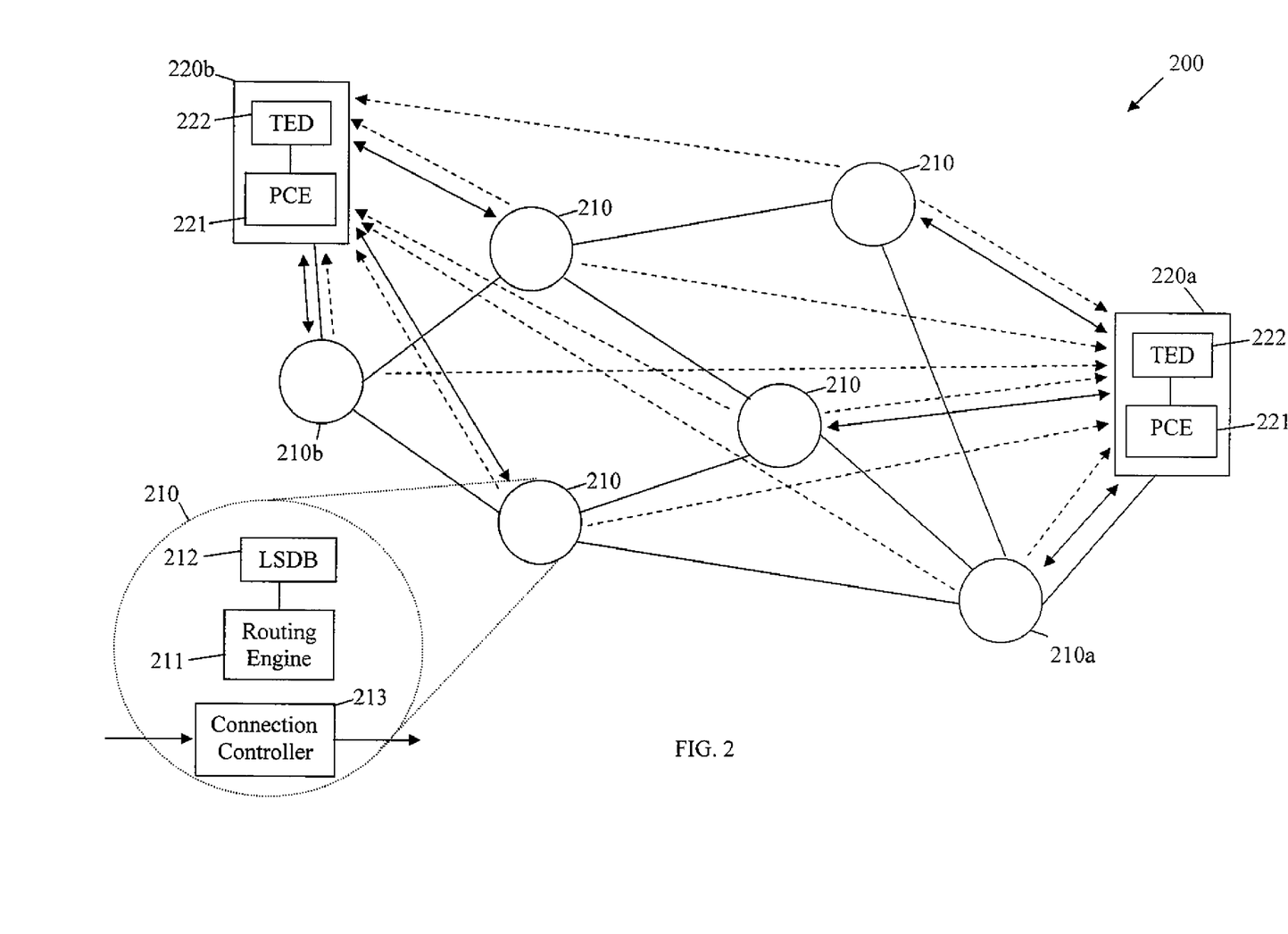
FIG. 2 is a schematic diagram of another embodiment of the first network architecture.

FIG. 2 illustrates an embodiment of a network 200. The network 200 may be a MPLS or GMPLS network, such as a WDM network or WSON. The components of the network 200 may be configured similar to the corresponding components of the first network architecture 100. Specifically, the network 200 may comprise a plurality of NEs 210 and a plurality of PCE servers 220, which may each comprise a PCE 221 coupled to a TED 222. The NEs 210 may be coupled to each other via optical, electrical, or wireless means, and at least one NE 210 may be coupled to one of the PCE servers 220 via a similar link. As such, at least some of the NEs 210 may communicate with the same PCE server 220, which may be in the same domain, via a direct link or indirectly via the links between the NEs 210. For instance, the NEs 210 may communicate with the PCE server 220a via the links with the NE 210a, which may be directly connected to the PCE server 220a. Similarly, the NEs 210 may communicate with the PCE server 220b via the links with the NE 210b, which may be directly connected to the PCE server 220b. By use of the term directly connected to describe the various architectures described herein, it will be understood that the NEs 210 may be directly (e.g. no intervening elements) or indirectly (e.g. at least one intervening element) connected to the PCE server 220, so long as no other NEs 210 are positioned in the communications path between the NE 210 and the PCE server 220.

In an embodiment, the NEs 210 may perform data routing using IGP without maintaining local TEDs and without using IGP-TE. Specifically, each of the nodes 110 may comprise a routing engine 211 and a LSDB 212, which may be used for forwarding the data using IGP. Each of the nodes 110 may also comprise a connection controller 213, which may receive a service request from a first neighboring NE 210 and subsequently signal a second neighboring NE 210 to route or forward the data. As such, the nodes 210 may also forward their local TE information to the associated PCE server 220, e.g. in the same domain, and obtain the assigned TE paths from the PCE server 220. For instance, a first subset of the NEs 210 may communicate with the PCE server 220a and a second subset of the NEs 210 may communicate with the PCE server 220b to obtain the computed TE paths, which is indicated by the solid lines in FIG. 2.

The NEs 210 may update the TEDs 222 at the PCE servers 220 by sending status update information to the PCE servers 220 periodically or upon demand. For instance, the NEs 210 may send their local TE information updates to each of the PCE server 220a and the PCE server 220b, which is indicated by dashed lines in FIG. 2. The NEs 210 may also discover any new PCE server 220, which may be added to the same domain of the NEs 210 in the network 200, and may hence forward their entire local TE information to the new PCE server 220. In some embodiments, the NEs 210 may also comprise local TEDs that comprise local TE information, and the NEs 210 may forward their entire local TE information to the new PCE server 220.

Figure 3:
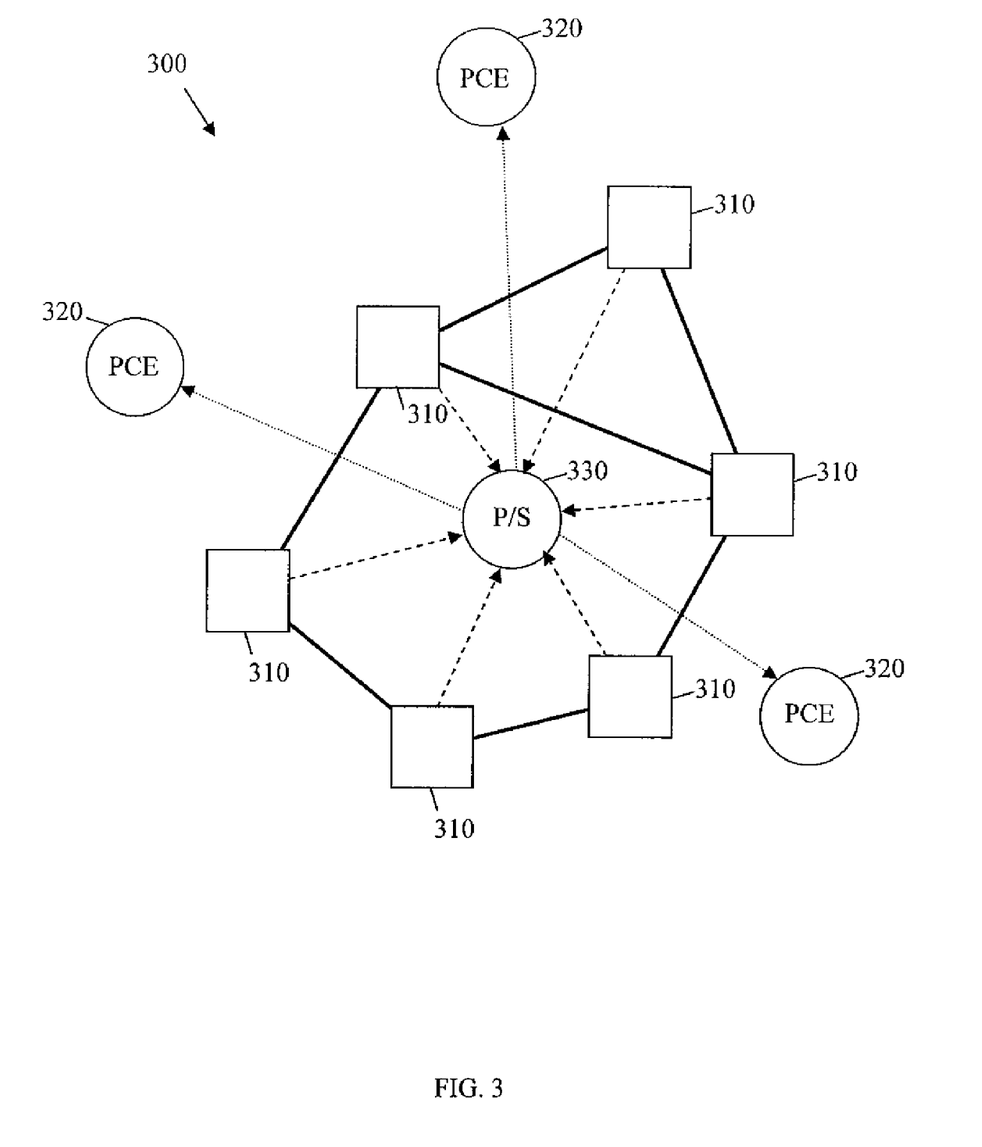
FIG. 3 is a schematic diagram of an embodiment of a second network architecture.

FIG. 3 illustrates one embodiment of a second network architecture 300, which may be used for a MPLS or GMPLS network. The second network architecture 300 may comprise a plurality of nodes 310 and a plurality of PCEs 320, which may be configured similar to the corresponding components of the first network architecture 100. Additionally, the second network architecture 300 may comprise a publisher/subscriber (P/S) server 330, which may act as an intermediary system between the nodes 310 and the PCEs 320. The P/S server 330 may be a typical P/S server, or may be a PCE configured to act as a P/S server. In an embodiment, the P/S server 330 may not perform any path computation calculations when the P/S server 330 is a PCE. In addition, the P/S server 330 may be configured to receive the TE information from the nodes 310 and forward the information to the PCEs 320. In some embodiments, the P/S server 330 may also receive the computed TE paths from the PCEs 320 and forward the TE paths to the assigned nodes 310. As such, the nodes 310 may be the publishers of the information and the PCEs 320 may be the subscribers to the information or vice-versa.

The P/S functionality of the P/S server 330 may be provided by a general messaging oriented middleware, such as a Java Messaging Service (JMS), version 1.1, published April 2002 by Sun Microsystems, which is incorporated herein by reference as if reproduced in its entirety. Using the P/S server 330 as an intermediate entity between the nodes 310 and the PCE 320 may be suitable to solve network scaling issues, which may be introduced when the quantity of PCEs 320 in the system increases. Such problems may result from the increase in communication size between the nodes 310 and the PCEs 320.

In an embodiment, the TE information may be routed from the node 310 to the PCEs 320 via the P/S server 330 using Border Gateway Protocol (BGP) route reflectors, as described by Bates et al. in IETF document RFC 4456, published April 2006, and entitled "BGP Route Reflection: An Alternative to Full Mesh Internal BGP (IBGP)," which is incorporated herein by reference as if reproduced in its entirety. In an alternative embodiment, the P/S server 330 may be located at or coupled to one of the PCEs 320, and thus may communicate with the other PCEs 320 in a master/slave-type system architecture. In yet another embodiment, the P/S server 330 may also be configured as a PCE 320, and thus may comprise a TED. Further, the P/S server 330 may be configured to communicate with any new PCE 320, which may be added to the same network domain of the P/S server 330, to create a TED at the new PCE 320. The P/S server 330 may also maintain a copy of the TED of any of the PCEs 320 as a backup in case of communication failures. Further, to improve communication reliability, the second network architecture 300 may comprise a second redundant P/S server (not shown), which may be a backup to the P/S server 330.

Figure 4:
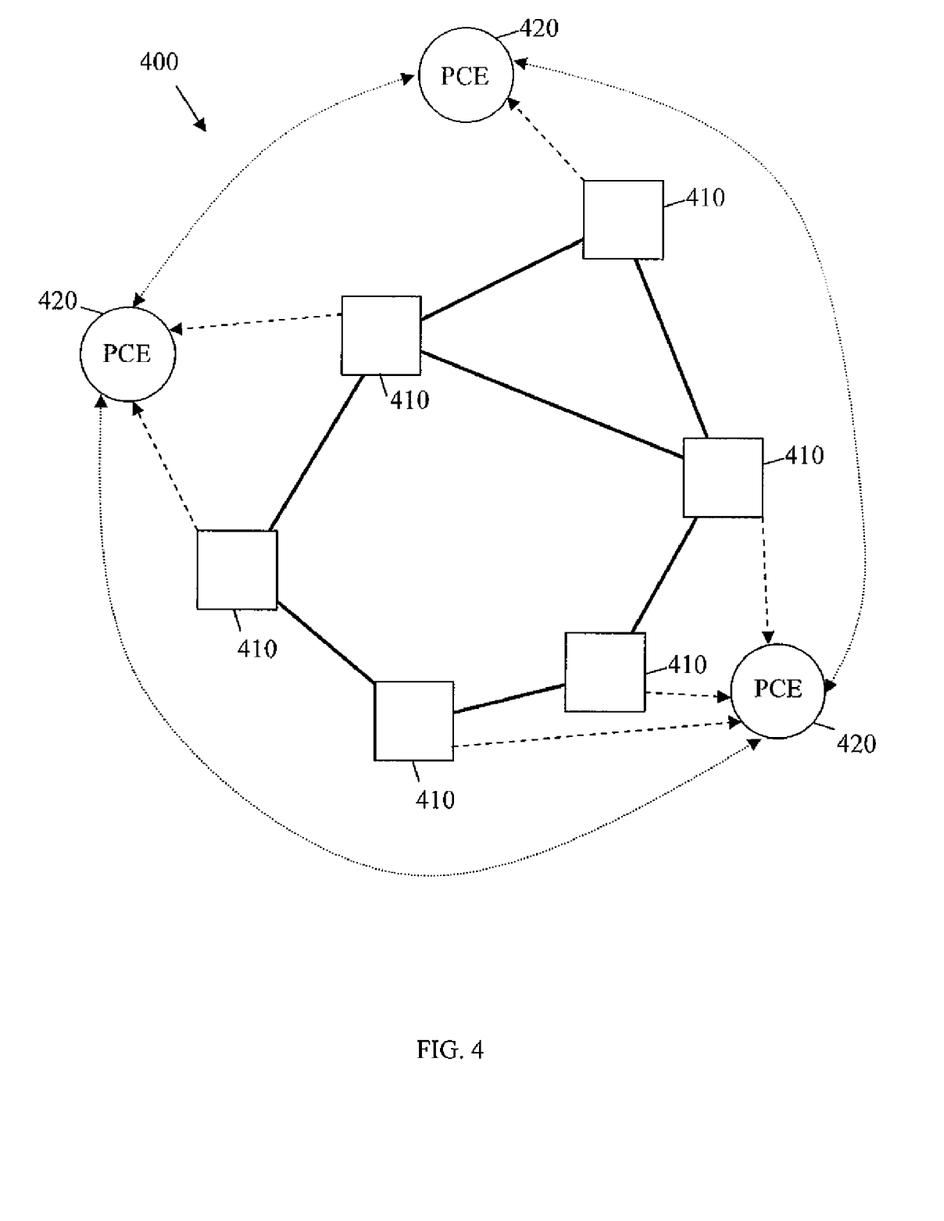
FIG. 4 is a schematic diagram of an embodiment of a third network architecture.

FIG. 4 illustrates one embodiment of a third network architecture 400, which may be used for a MPLS or GMPLS based network. The third network architecture 400 may comprise a plurality of nodes 410 and a plurality of PCEs 420, which may be configured similar to the corresponding components of the first network architecture 100. However, each PCE 420 may comprise a TED, which may comprise the TE information for less than all of the nodes. Specifically, the TE information stored at each PCE 420 may comprise the TE information from the nodes 410 that are associated with the PCE 420, but not from the remaining nodes 410. As such, the TEDs of the different PCEs 420 may comprise different TE information from different nodes 410. Alternatively, the PCEs 420, which may be in the same domain, may share their corresponding TE information with one another to compile and maintain complete TE information that comprise all the needed TE information from all the nodes 410. In another alternative embodiment, the PCEs 420 may create and maintain a single TED remote from any of the PCEs and comprising all the TE information from all the nodes 410 within the same domain. For instance, each PCE 420 may receive their corresponding TE information from a subset of the nodes 410. The PCEs 420 may then use their corresponding TE information to create and maintain the TED.

In an embodiment, the PCEs 420 may share their TE information using a PCEP that may be configured similar to a link state protocol. However, unlike the link state protocols, the PCEP may be used to share the information obtained from the associated nodes 410. Accordingly, the PCEs 420 may be configured to peer with one another and use discovery mechanisms to find one another, e.g. using PCE discovery procedures similar to the nodes 110. In an embodiment, if a new PCE 420 is added to same domain as the existing PCEs 420, the new PCE 420 may peer with at least one of the existing PCEs 420. Hence, to initialize a new TED at the new PCE 420, the new PCE 420 may establish TED synchronization with the existing PCEs 420, for instance using a plurality of link state procedures of the PCEP.

In an embodiment, control plane resilience may be needed in the third network architecture 400. As such, each node 410 may be configured to send its TE information to at least one of a primary PCE and a secondary PCE from the PCEs 420, which may be both associated with the node 410. For example, in a warm standby scheme, the node 410 may initially send its TE information to its associated primary PCE but not to its associated secondary PCE. However, if communications fail between the node 410 and the primary PCE, the node 410 may begin sending its TE information to the secondary PCE. Alternatively, in a hot standby scheme, each node 410 may be configured to send its TE information each time to its associated primary PCE and secondary PCE, which may more reliably deliver information in the case of communications failure with one of the two associated PCEs.

In an embodiment, the nodes described herein may use discovery extensions that allow the nodes to obtain information about the existing PCEs in the network. For instance, the nodes may use the discovery extensions for OSPF, as described by LeRoux et al. in IETF document RFC 5088, published January 2008, and entitled "OSPF Protocol Extensions for Path Computation Element (PCE) Discovery," which is incorporated herein by reference as if reproduced in its entirety. The nodes may also use the discovery extensions for IS-IS, as described LeRoux et al. in IETF document RFC 5089, published January 2008, and entitled "IS-IS Protocol Extensions for Path Computation Element (PCE) Discovery," which is incorporated herein by reference as if reproduced in its entirety.

In an embodiment, when the nodes find the existing PCEs in the network, the nodes may determine whether any of the existing PCEs are ready to receive TE information from the nodes. In an embodiment, the nodes may be directed to an intermediary system (e.g. P/S system), which may determine on behalf of the nodes whether any of the PCEs is ready to receive TE information from the nodes. By directly connected, it will be understood that the NEs 210 may be directly (e.g. no intervening elements) or indirectly (e.g. at least one intervening element) connected to the intermediary system, so long as no other NEs 210 are positioned in the communications path between the NE 210 and the intermediary system. Accordingly, the discovery mechanisms or extension used by the nodes may be extended or the location of the intermediary system may be configured to support PCE discovery by the nodes.

Additionally, an association may be first established between the nodes and the PCE ready to receive TE information (or with the intermediary system between the nodes and the PCE) before maintaining the TED at a PCE. The nodes may then share their TE information with the PCE, such as information about the nodes' local environment, e.g. links and node properties. The content of the TE information may be specified by general and/or technology specific information models and the format of the TE information may be determined by the specific protocols used in the network. In some embodiments, the nodes may send to the PCE a portion of their TE information, which may be based on the path computation option used in the network. For instance, in a WSON, a separate routing (R) and wavelength assignment (WA) option may be used, where the nodes may be responsible for routing and the PCE may be responsible for wavelength assignment, as described by Lee et al. in IETF document draft-lee-pce-wson-routing-wavelength-05.txt, published February 2009, and entitled "PCEP Requirements for the support of Wavelength Switched Optical Networks (WSON)," which is incorporated herein by reference as if reproduced in its entirety. As such, the nodes may only send the WSON link usage information to the PCE.

In an embodiment, to create and maintain the TED, the PCE may establish and authenticate communications with the nodes that may originate the TE information stored in the TED. The PCE may also update its TED in a timely manner using information received from the associated nodes, from peer PCEs, other network entities, or combinations thereof. Additionally, the PCE may verify the validity of the information in the TED, for instance by verifying that the information obtained from the nodes or other entities are substantially up to date. For example, using a process similar to functionality provided by IGP, the PCE may discard blocks or "chunks" of TE information when they become outdated or "aged." Additionally, the nodes may send their TE information periodically to keep the TED up to date.

In an embodiment, any of the network architectures described herein may support a plurality of functions, which may be suitable for standardization. For instance, functions suitable for standardization may comprise a TE information model, basic PCE TED creation and maintenance procedures, and information packaging for TED creation, maintenance, and exchange. Additionally, the functions suitable for standardization may include node to PCE (or P/S) communication of TE information, interface, and protocol, such as a PCEP. Such functions may also comprise the NE or node PCE (or P/S) discovery for TED creation and maintenance purposes.

The TE information model may comprise the raw or basic information that may be used for a path computation model independent of the information packaging for TED creation, maintenance, and exchange. For example, the TE information model may include an information model for WSONs for non-impairment RWA and for impairment aware RWA. Given a TE information model and basic PCE TED creation and maintenance procedures, information packaging for TED creation, maintenance, and exchange may be standardized. The basic PCE TED creation and maintenance procedures may be configured similar to IGP database maintenance procedures, such as aging and packaging of link state information into link state advertisements (LSAs), which may comprise the basic blocks or chunks of an IGP's database. For example, the OSPF LSAs may comprise an age field, which may be used in the ageing procedure, and an advertising router field, which may aid in redistribution decisions, e.g. flooding. The OSPF LSAs may be configured as described by Berger et al. in IETF document RFC 5250, published July 2008, and entitled "The OSPF Opaque LSA Option," which is incorporated herein by reference as if reproduced in its entirety. The LSAs may also comprise detailed TE information, which may be encoded or packaged into type-length-value (TLV) triplets and used for path computation. Further, the TE information communication interface between the NE and PCE, which may comprise NE and PCE behaviors and communications protocols, may be standardized.

In an embodiment, the functions in the network architectures that may be standardized may comprise the functions that may be used to support a new PCE in the network, such as the discovery of the new PCE and the initialization of the TED. Additionally, the functions in the network architectures that may be standardized may comprise the synchronization between a new PCE and the P/S server, and the communications between the PCEs and the P/S server. Further, the standardized functions in the network architectures may also comprise the PCE to PCE interface and protocol, the PCE to PCE discovery method for TE information sharing, and the PCE to PCE association for information sharing, such as sharing update information.

Figure 5:
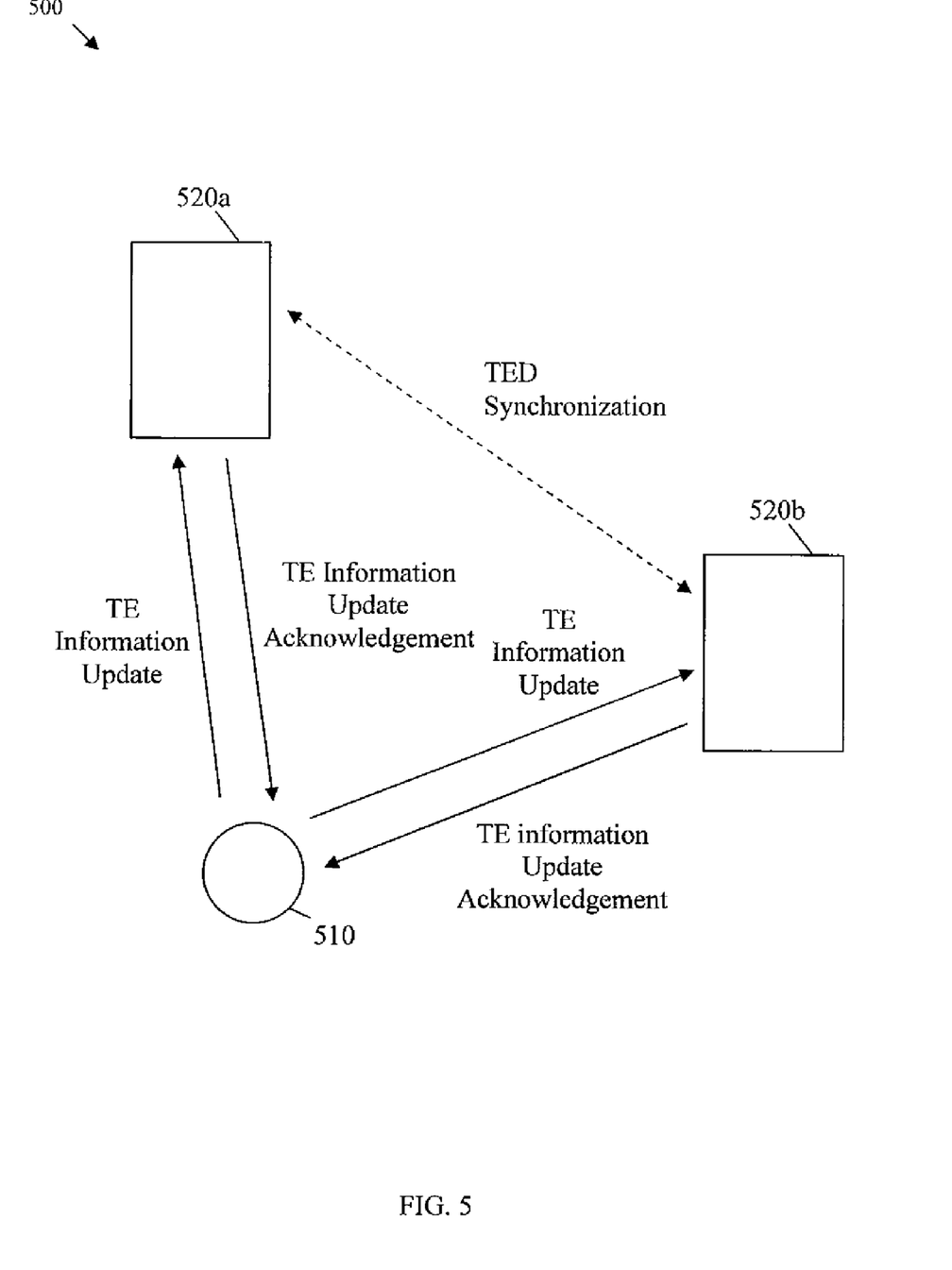
FIG. 5 is a schematic diagram of an embodiment of a TED synchronization process.

FIG. 5 illustrates an embodiment of a TED synchronization process 500, for instance which may be used in the network architectures described herein. Specifically, the TED synchronization process 500 may be performed between a node 510, a first PCE server 520a, and a second PCE server 520b, which may be configured similar to the corresponding components of the network architectures described herein. Accordingly, the node 510 may send a TE information update to the first PCE server 520a, the second PCE server 520b, or both, which may be used to update the corresponding TED(s). For instance, the node 510 may send the same TE information update or different TE information updates to the first PCE server 520a and the second PCE server 520b. The node 510 may then receive a TE information update acknowledgement, which may indicate that the TE information update has been received and/or the TED has been updated. When the first PCE server 520a, the second PCE server 520b, or both receive the TE information update from the node 510, the first PCE server 510a, the second PCE server 520b, or both may synchronize their corresponding TED(s) with one another, for instance using a TED synchronization procedure. As such, the TEDs at the first PCE server 520a and the second PCE server 520b may be synchronized after each TE information update from the node 510.

Figure 6:
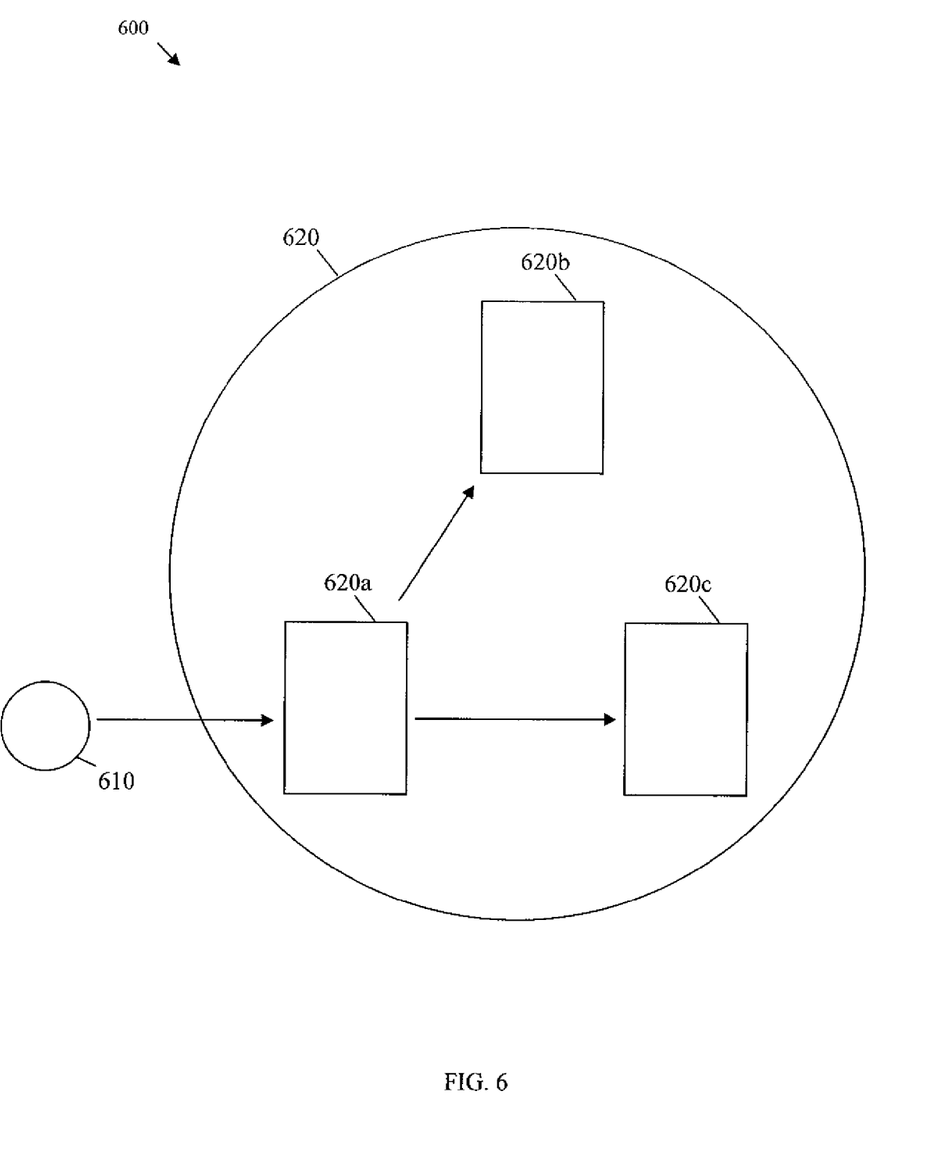
FIG. 6 is a schematic diagram of another embodiment of the TED synchronization process.

FIG. 6 illustrates an embodiment of another TED synchronization process 600 that may be used with network architectures described herein. Specifically, the TED synchronization process 600 may be performed between a node 610, and a plurality of PCE servers 620 including a first PCE server 620a, a second PCE server 620b, and a third PCE server 620c, which may be configured based on network architectures described herein. Accordingly, the node 610 may send its TE information to the first PCE server 620a but not to the remaining PCE servers 620, which may be in the same domain. In some embodiments, the node 610 may also send its TE information to another PCE server in another set of PCE servers (not shown). When the first PCE server 620a receives the TE information from the node 610, the first PCE server 620a may perform TED synchronization with the second PCE server 620b, the third PCE server 620c, and any other PCE server 620. If one of the PCE servers 620 fails, for example due to a node or link failure, the other PCE servers 620 may be informed of the failure, for instance by the node 610. As such, the PCE servers 620 may perform additional TED synchronization apart from the periodic or scheduled TED synchronization. Further, if the first PCE server 620a, which may be configured to receive the TE information from the node 610, fails due to a link or node failure, another PCE server 620 may be selected, for instance by the node 610, to receive the TE information from the node 610.

Figure 7:
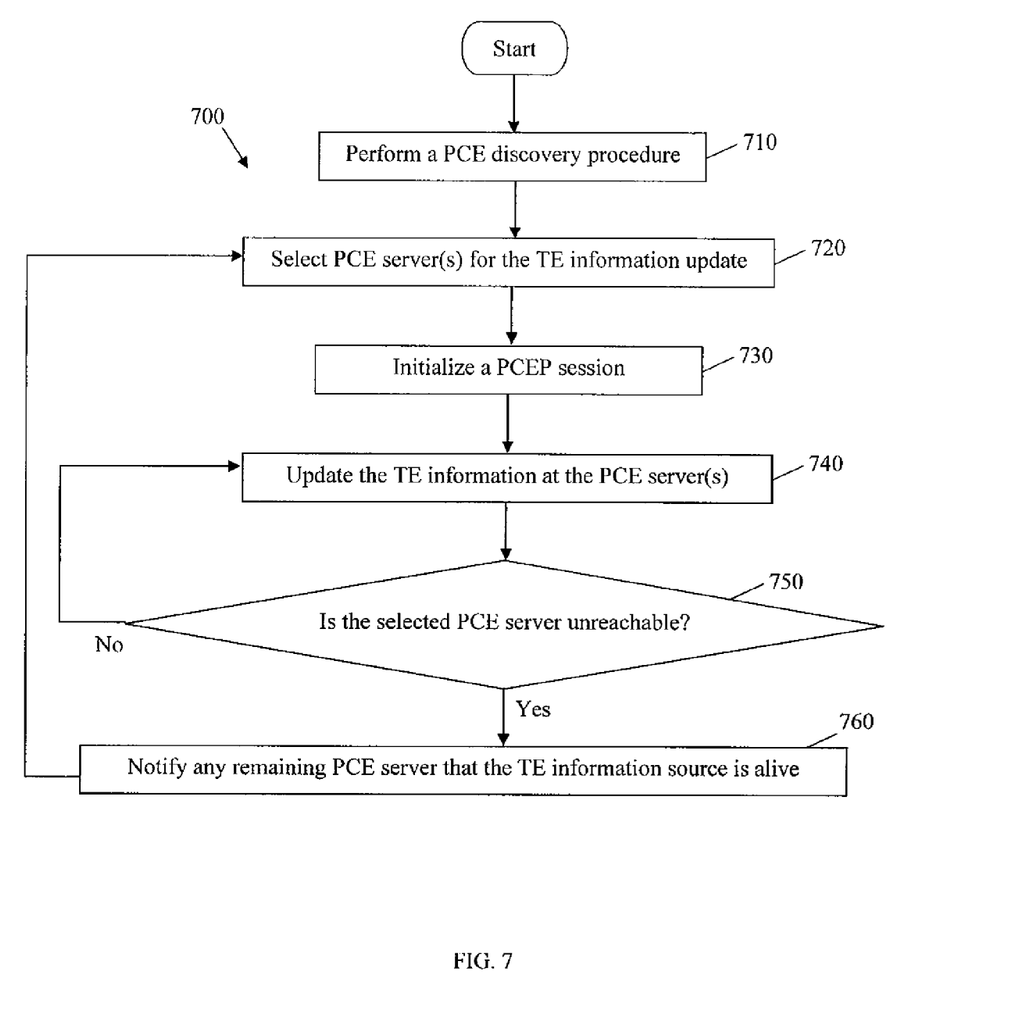
FIG. 7 is a flowchart of an embodiment of a PCE server updating and synchronization method.

FIG. 7 illustrates one embodiment of a PCE server updating and synchronization method 700, which may be used in the network architectures described herein. The method 700 may begin at block 710, where a PCE discovery procedure may be performed. For instance, a node or a NE, such as the NE 210, may use a PCE discovery protocol (PCEDP) to discover at least one new or existing PCE server, such as the PCE server 220, which may be configured to accept direct TE information updates from the node. In some embodiments, a first PCE server may use the PCEDP to discover at least one other PCE server when the other PCE servers are in the same domain.

The method 700 may then proceed to block 720, where at least one PCE server may be selected for the TE information update, for instance by a node or NE. Selecting the PCE server may be based on a plurality of network factors, such as the distance or number of hops between the node and the PCE server and/or the current workload of the PCE. For instance, the PCE server may be selected based on its current workload to balance the workloads of the PCEs in the same domain. The workload of the PCE may be estimated based on a response time of a previous TE information update. The method 700 may then proceed to block 730, where a PCEP session may be initialized. For instance, the node may establish a plurality of PCEP sessions with a plurality of corresponding PCE servers in the network. In addition, the node may associate with more than one PCE server for the TE information update. The method 700 may then proceed to block 740, where TE information at the PCE server may be updated. For instance, the node may send is updated TE information to at least one of the selected PCE servers or to each of the PCE servers associated with the node.

The method 700 may then proceed to block 750, where a determination may be made as to whether the selected PCE server may be unreachable. For instance, the node may determine whether the PCE server may not be reached due to a link failure. If the selected PCE server is reachable, the method 700 may return to block 740. If the selected PCE server is unreachable, the method 700 may proceed to block 760. Otherwise, the method 700 may return to block 740. At block 760, any remaining PCE server may be notified that the TE information source or node is active or alive. Accordingly, the remaining PCE server may expect TE information updates from the node. After block 760, the method 700 may return to block 720. If the selected PCE server remains reachable, the method 700 may return to block 740.

Figure 8:
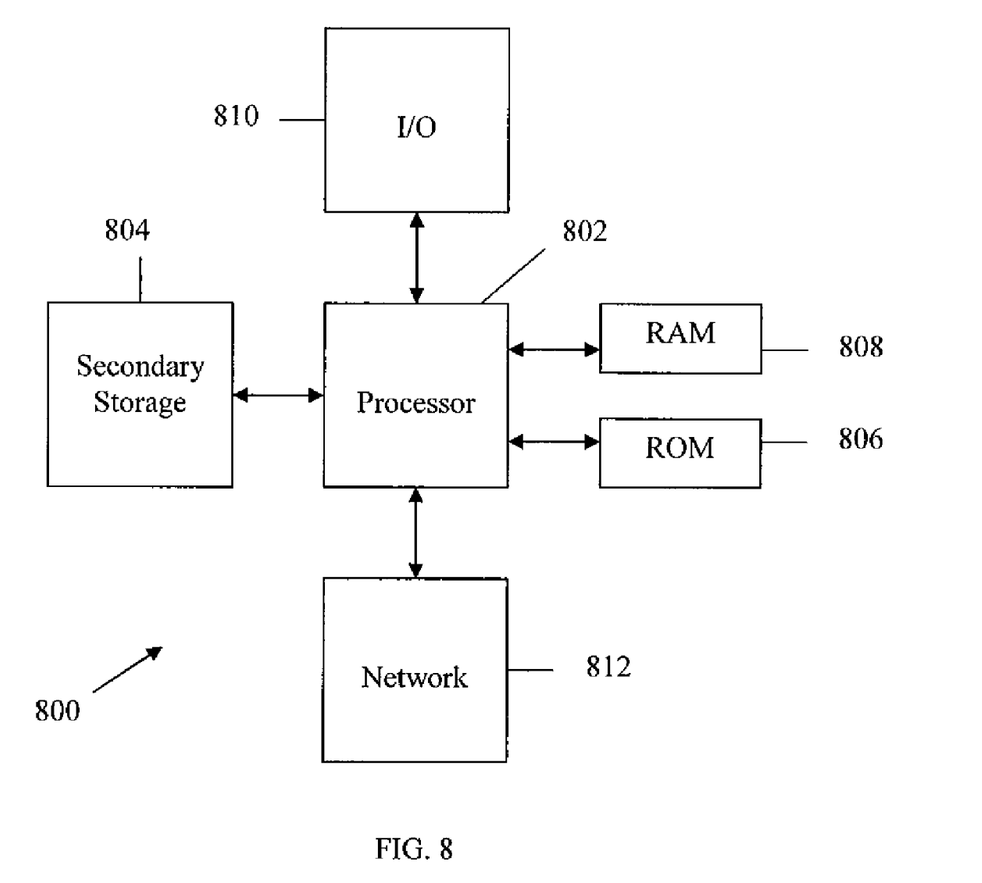
FIG. 8 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascer-

What is claimed is:

1. An apparatus comprising:
a network node configured to communicate with a path computation element (PCE) and a neighbor node, wherein the neighbor node is located in the same network domain as the network node;
wherein the network node is configured to send a local traffic engineering (TE) information directly to the PCE without sending the local TE information to the neighbor node, and
wherein the local TE information is used by the PCE to compute a TE path through the same network domain.

2. The apparatus of claim 1, wherein neither the network node nor the neighbor node perform any TE path computations.

3. The apparatus of claim 1, wherein the network node is further configured to flood a local topology information to the PCE and the neighbor node using an interior gateway protocol (IGP).

4. The apparatus of claim 1, wherein the network node is further configured to establish a PCE protocol (PCEP) session with the PCE.

5. The apparatus of claim 1, wherein the network node is further configured to:
communicate with a second PCE; and
send the local TE information directly to the second PCE without sending the local TE information to the neighbor node.

6. An apparatus comprising:
a network node configured to:
communicate with a publisher/subscriber (P/S) server and a neighbor node that are both located in the same network domain as the network node; and
send a local traffic engineering (TE) information directly to the P/S server without sending the local TE information to the neighbor node,
wherein the local TE information is used by a Path Computation Element (PCE) to compute a TE path through the same network domain.

7. The apparatus of claim 6, wherein the P/S server distributes the local TE information to the PCE.

8. The apparatus of claim 6, wherein the P/S server comprises the PCE.

9. The apparatus of claim 6,
wherein the P/S server distributes the local TE information to the PCE,
wherein the PCE distributes the local TE information to a second PCE and a third PCE, and
wherein the second PCE and the third PCE do not share the local TE information.

10. The apparatus of claim 1, wherein the network node comprises a link state database (LSDB) and a TE database (TED) that consists essentially of the local TE information, and wherein the network node is configured to send a local topology information to the neighbor node.

11. The apparatus of claim 1, wherein the network node is configured to send both a local topology information and the local TE information to the PCE, and wherein the network node is configured to send the local topology information to the neighbor node.

12. A method for distributing information in a network domain, the method comprising:
receiving, by a first path computation element (PCE), a traffic engineering (TE) information from a first neighbor node of a plurality of neighbor nodes in the network domain, wherein the first neighbor node does not flood the TE information to the other neighbor nodes;
updating a first TE database (TED) located in the first PCE using the TE information; and
synchronizing the first TED with a second TED located in a second PCE.

13. The method of claim 12, wherein the first neighbor node does not send the TE information directly to the second PCE.

14. The method of claim 12 further comprising transmitting, by the first PCE, a TE information acknowledgement to the first neighbor node upon receiving the TE information.

15. The method of claim 12 further comprising establishing a PCE protocol (PCEP) session between the first neighboring node and the first PCE, wherein the TE information is communicated to the first PCE via the PCEP session.

16. The apparatus of claim 1, wherein the network node and the neighbor node comprise interior nodes that do not communicate directly with other network domains.

17. A network comprising:
a Path Computation Element (PCE); and
a network domain comprising a plurality of neighboring nodes,
wherein a first neighbor node of the neighboring nodes is configured to:
distribute topology information throughout the network domain by flooding the topology information to other neighboring nodes; and
send a traffic engineering (TE) information directly to the PCE without communicating the TE information to any of the neighboring nodes, wherein the PCE is configured to compute a TE path through the network domain using the TE information.

18. The network of claim 17, wherein the PCE is further configured to update a TE database (TED) located at the PCE using the TE information.

19. The network of claim 17 further comprising a second PCE, wherein the first neighboring node is further configured to send the TE information to the second PCE when the PCE is unavailable.

20. The network of claim 17 further comprising a second PCE, wherein the first neighboring node does not send the first TE information to the second PCE, and
wherein a second one of the neighboring nodes is configured to send a second TE information directly to the second PCE without sending the second TE information to the first neighboring node and the PCE.

21. The network of claim 20 further comprising;
a first TE database (TED) located at the PCE; and
a second TED located at the second PCE,
wherein the first PCE and the second PCE are configured to synchronize the first TED and the second TED by exchanging the local TE information, neighbor TE information, or both, and wherein the first neighboring node does not send the local TE information to the second PCE.

22. The network of claim 17, wherein the TE information comprises wavelength switched optical network (WSON) information for non-impairment routing and wavelength assignment (RWA), WSON information for impairment aware RWA, or both.

23. The network of claim 17, wherein the TE information is contained in an object or a type-length-value (TLV) field embedded in a PCE Protocol (PCEP) message.

* * * * *

UNITED STATES PATENT AND TRADEMARK OFFICE
CERTIFICATE OF CORRECTION

PATENT NO. : 8,358,662 B2  
APPLICATION NO. : 12/545663  
DATED : January 22, 2013  
INVENTOR(S) : Greg M. Bernstein et al.

Page 1 of 1

It is certified that error appears in the above-identified patent and that said Letters Patent is hereby corrected as shown below:

Column 14, line 54, claim 21 should read as follows: "The network of claim 20 further comprising; a first TE database (TED) located at the PCE; and a second TED located at the second PCE, wherein the first PCE and the second PCE are configured to synchronize the first TED and the second TED by exchanging local TE information, neighbor TE information, or both, and wherein the first neighboring node does not send the local TE information to the second PCE."

Signed and Sealed this  
Twenty-sixth Day of March, 2013

Teresa Stanek Rea  
*Acting Director of the United States Patent and Trademark Office*